(12) United States Patent
Susumu

(10) Patent No.: US 11,630,434 B2
(45) Date of Patent: Apr. 18, 2023

(54) THERMAL DISPLACEMENT COMPENSATION DEVICE AND NUMERICAL CONTROLLER

(71) Applicant: FANUC CORPORATION, Yamanashi (JP)

(72) Inventor: Yasuaki Susumu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 345 days.

(21) Appl. No.: 16/598,968

(22) Filed: Oct. 10, 2019

(65) Prior Publication Data

US 2020/0117164 A1 Apr. 16, 2020

(30) Foreign Application Priority Data

Oct. 12, 2018 (JP) .............................. JP2018-193338

(51) Int. Cl.
*G05B 19/404* (2006.01)

(52) U.S. Cl.
CPC .. *G05B 19/404* (2013.01); *G05B 2219/49206* (2013.01)

(58) Field of Classification Search
CPC ........ G05B 19/404; G05B 2219/49206; G05B 2219/49219
See application file for complete search history.

(56) References Cited

U.S. PATENT DOCUMENTS

| 2002/0004688 | A1* | 1/2002 | Kojima | B23Q 3/15534 700/193 |
| 2008/0005604 | A1* | 1/2008 | Mizukado | G05B 19/404 713/322 |
| 2011/0232120 | A1* | 9/2011 | Tullmann | G05B 19/404 33/701 |
| 2012/0165971 | A1* | 6/2012 | Murahashi | G05B 19/404 700/175 |

(Continued)

FOREIGN PATENT DOCUMENTS

| CN | 109070295 B | * | 3/2016 | ............ G06F 17/16 |
| JP | 2012-139741 A | | 7/2012 | |

(Continued)

OTHER PUBLICATIONS

Takeshi Morishima, Thermal displacement error compensation in temperature domain, Elsevier Inc. (Year: 2015).*

(Continued)

*Primary Examiner* — Darrin D Dunn
(74) *Attorney, Agent, or Firm* — Studebaker & Brackett PC

(57) ABSTRACT

To provide a numerical controller capable of setting an index for an axis combination in a path and selecting a proper compensation model using the index. A numerical controller comprises: a thermal displacement compensation setting unit that sets an index of an axis combination as a target of implementation of thermal displacement compensation from control axis information data in which a control axis is recognizable, and finds a compensation model index match- (Continued)

ing the index, thereby selecting a corresponding compensation model; and a thermal displacement compensation unit that calculates a compensation value from operating state data having correlation with thermal displacement and from the compensation model.

10 Claims, 13 Drawing Sheets

(56) References Cited

U.S. PATENT DOCUMENTS

| | | | | |
|---|---|---|---|---|
| 2013/0322772 | A1* | 12/2013 | Seo | G06V 10/462 |
| | | | | 382/209 |
| 2015/0370242 | A1* | 12/2015 | Takeno | G05B 19/404 |
| | | | | 700/193 |
| 2016/0001410 | A1* | 1/2016 | Koyama | B23Q 15/12 |
| | | | | 700/170 |
| 2017/0006394 | A1* | 1/2017 | Risberg | H04R 3/007 |
| 2017/0185063 | A1* | 6/2017 | Suzuki | G05B 19/406 |
| 2017/0193401 | A1* | 7/2017 | Grehant | G06N 7/005 |
| 2018/0181875 | A1* | 6/2018 | Motohashi | G06Q 10/04 |
| 2018/0196405 | A1* | 7/2018 | Maekawa | G05B 19/4155 |
| 2018/0276570 | A1* | 9/2018 | Watanabe | G06N 20/00 |

FOREIGN PATENT DOCUMENTS

| | | | |
|---|---|---|---|
| JP | 5568005 B2 | 8/2014 | |
| JP | 5985124 B1 * | 9/2016 | ........... G05B 19/402 |
| JP | 2017-170532 A | 9/2017 | |
| JP | 2018-111145 A | 7/2018 | |

OTHER PUBLICATIONS

Kuang-Chao Fan, An Intelligent Thermal Error Compensation System for CNC Machining Centers, J. of Chinese Society of Mechanical Engineers, vol. 28, No. 1, pp. 81-90 (Year: 2007).*

An Office Action; "Notice of Reasons for Refusal", mailed by the Japanese Patent Office dated Nov. 4, 2020, which corresponds to Japanese Patent Application No. 2018-193338 and is related to U.S. Appl. No. 16/598,968 ; with English language translation.

* cited by examiner

FIG. 4

|  | ABSOLUTE PATH NUMBER | RELATIVE AXIS NUMBER | REMARKS |
|---|---|---|---|
| X1 AXIS | 1 | 1 | FIRST PATH, FIRST AXIS |
| Z1 AXIS | 1 | 2 | FIRST PATH, SECOND AXIS |
| X2 AXIS | 2 | 1 | SECOND PATH, FIRST AXIS |
| Z2 AXIS | 2 | 2 | SECOND PATH, SECOND AXIS |

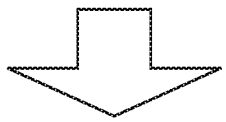

TARGET AXIS INDEX OF PATH 1 = [101   102   0]
TARGET AXIS INDEX OF PATH 2 = [201   202   0]

TARGET AXIS NUMBER = ABSOLUTE PATH NUMBER * 100 + RELATIVE AXIS NUMBER
TARGET AXIS INDEX = [ FIRST TARGET AXIS NUMBER    SECOND TARGET AXIS NUMBER    THIRD TARGET AXIS NUMBER ]

FIG. 8
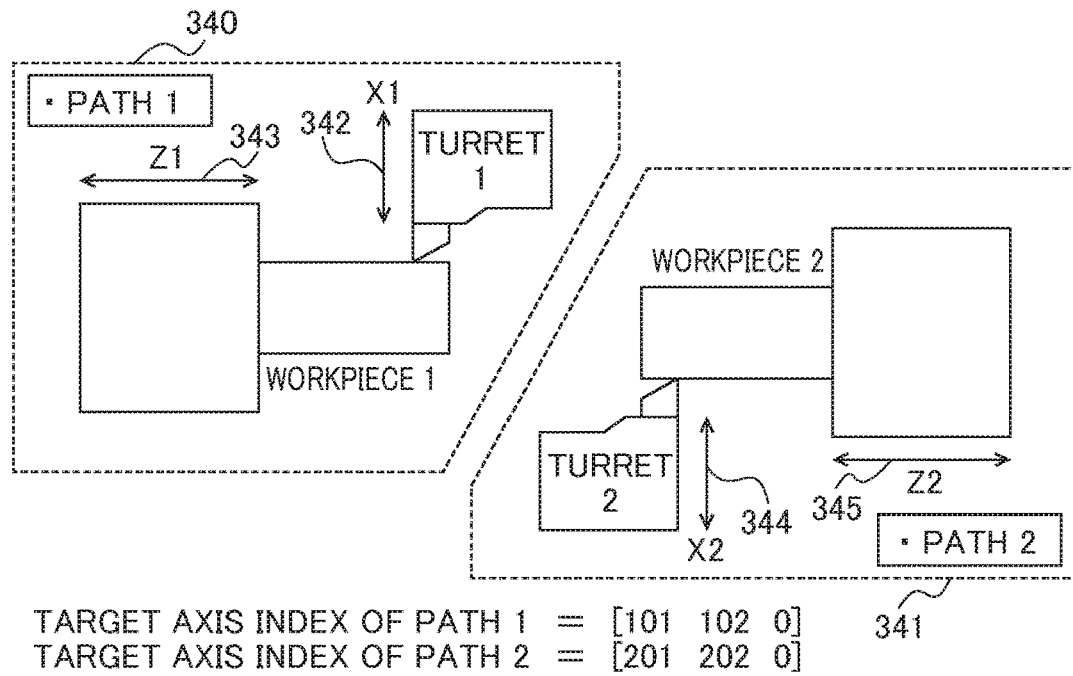
TARGET AXIS INDEX OF PATH 1 = [101 102 0]
TARGET AXIS INDEX OF PATH 2 = [201 202 0]
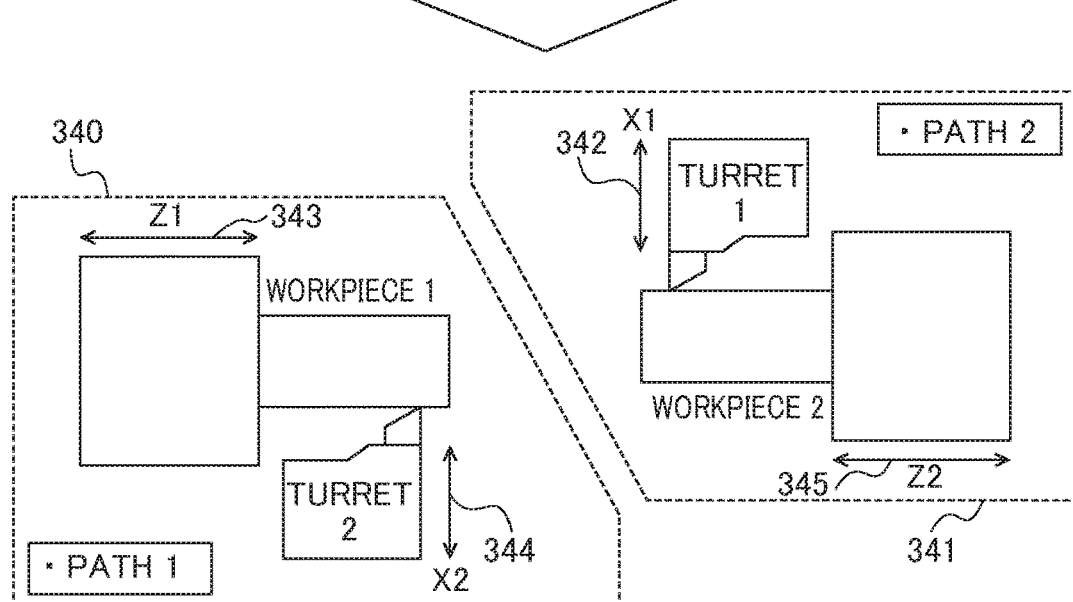
TARGET AXIS INDEX OF PATH 1 = [201 102 0]
TARGET AXIS INDEX OF PATH 2 = [101 202 0]
TARGET AXIS NUMBER = ABSOLUTE PATH NUMBER * 100 + RELATIVE AXIS NUMBER
TARGET AXIS INDEX = [ FIRST TARGET AXIS NUMBER  SECOND TARGET AXIS NUMBER  THIRD TARGET AXIS NUMBER ]

THERMAL DISPLACEMENT COMPENSATION DEVICE AND NUMERICAL CONTROLLER

This application is based on and claims the benefit of priority from Japanese Patent Application No. 2018-193338, filed on 12 Oct. 2018, the content of which is incorporated herein by reference.

BACKGROUND OF THE INVENTION

Field of the Invention

The present invention relates to a thermal displacement compensation device and a numerical controller having a function of automatically setting a thermal displacement compensation model.

Related Art

According to a technique conventionally suggested, machine information responsive to the specification of a machine tool is made readable, and an estimated parameter (compensation model) for thermal displacement compensation is selected on the basis of the machine information (patent document 1, for example). According to this technique, even in the case of a machine tool having a large number of specifications, providing a compensation value estimation device for estimating a thermal displacement compensation value of the machine tool corresponding to each specification, a parameter automatic selection device, etc., makes it possible to select a parameter belonging to each specification from a database on the basis of machine information corresponding to this specification. According to this technique, further, an estimated thermal displacement at each machine part is calculated using the selected parameter, and the estimated thermal displacements are added.

There has also been a suggested technique of canceling rapid change in a thermal displacement compensation value occurring during switching between a plurality of thermal displacement compensation models (patent document 2, for example). According to this technique, a first compensation model and a second compensation model are prepared as thermal displacement compensation models. During switching between these models (from the first model to the second model, for example), a compensation value of a command value is determined using a difference between compensation values and a compensation value about the second compensation model (complementation of a compensation value). By doing so, this technique allows canceling of rapid change in a compensation value. A compensation model is switched on the basis of a coordinate position.

There has been a suggested thermal displacement compensation function by which a thermal displacement of a machine tool is estimated from a thermal displacement compensation model and temperature data, and a compensation value corresponding to the thermal displacement is added to an axis stroke (patent document 3, for example). According to this technique, a thermal displacement model is made through machine learning, for example, and a compensation value is calculated from the compensation model and operating state data (temperature data, for example). According to this technique, if a difference between an estimated value and an actually measured value is not a threshold or is not less than the threshold, a compensation model is calculated again.

FIG. 12 is an explanatory view of this technique. A machine tool 1 is provided with a temperature sensor 2 and a displacement sensor 3 to allow detection of a temperature and a displacement. The machine tool 1 includes various types of machine tools such as a machining center (with an x axis, a y axis, and a z axis), a lathe (with only an x axis and a z axis), etc.

The detected temperature and displacement are used as learning data 4 to make (thermal displacement) compensation model calculation 5. The compensation model calculation 5 is calculation of determining a thermal displacement compensation model 5-3 through machine learning. More specifically, this calculation is made by learning software 5-1 by performing machine learning 5-2 on the basis of the learning data 4 and making the thermal displacement compensation model 5-3. Patent document 3 (Japanese Unexamined Patent Application, Publication No. 2018-111145) discloses one of such techniques of making a thermal displacement compensation model through machine learning. Making training data by employing a technique such as that disclosed in patent document 3 is one of preferred methods. The learning software 5-1 may be executed on a predetermined computer. The learning data 4 may be data acquired in advance before machining.

Next, compensation value calculation and output 6 is performed during an actual machining process using the determined thermal displacement compensation model 5-3. The compensation value calculation and output 6 may be performed by a computerized numerical control (CNC) device 6-2, for example. The CNC device 6-2 calculates an instruction (axis stroke) to be given to the machine tool 1, and outputs the calculated instruction. At this time, the CNC device 6-2 calculates a compensation value using the thermal displacement compensation model 5-3, and adds the compensation value to an axis stroke. The axis stroke compensated for in this way is output to the machine tool 1. In response to this, the machine tool 1 performs its operation by following the axis stroke subjected to the compensation 6-3. Meanwhile, the machine tool 1 includes the temperature sensor 2. A temperature collecting unit 6-1 reads a temperature from the temperature sensor 2, and supplies the read temperature to the CNC device 6-2. The CNC device 6-2 performs the compensation value calculation and output 6 using the thermal displacement compensation model 5-3 on the basis of the supplied temperature. Then, the same process is repeated. As a result, resultant machining becomes insusceptible to the influence of heat. Such process is already existing and may be called AI thermal displacement compensation, for example.

Patent Document 1: Japanese Patent No. 5568005

Patent Document 2: Japanese Unexamined Patent Application, Publication No. 2017-170532

Patent Document 3: Japanese Unexamined Patent Application, Publication No. 2018-111145

SUMMARY OF THE INVENTION

The foregoing technique is expected to realize machining insusceptible to the influence of heat. However, the technique disclosed in patent document 3 requires a compensation model to be changed for each axis combination in a path. This necessitates a user to manually associate a path (axis combination) and a compensation model to be applied to this path.

Namely, there arise the following problems:

(1) A path to be used and a compensation model should be associated before machining. Increase in the number of paths causes the risk of "increase in erroneous settings" and "a heavier load on a user."

(2) If an axis combination is changed during machining by exerting axis switching control, for example, it becomes difficult to automatically switch a compensation model in response to the axis combination.

These problems are illustrated in FIG. 13. In the illustration of FIG. 13, four types of compensation models including a compensation model 1 (7-1), a compensation model 2 (7-2), a compensation model 3 (7-3), and a compensation model 4 (7-4) are prepared. FIG. 13 further shows that a path 1 (8) includes an X1 axis 10 and a Z1 axis 11, and a path 2 (9) includes an X2 axis 12 and a Z2 axis 13. Before implementation of machining, a compensation model is required to be associated with the X1 axis 10 and the Z1 axis 11 in the path 1 (8). Likewise, before implementation of the machining, a compensation model is required to be associated with the X2 axis 12 and the Z2 axis 13 in the path 2 (9). In response to the occurrence such as switching between axes during the machining, a user is required to select an appropriate compensation model and make a switch to this compensation model. This is considered to bring about a tendency toward a heavier load on a user.

Further, the following issues are applied to all of patent documents 1, 2, and 3:

(3) Consideration is not given to setting a compensation model automatically in response to a path and an axis combination.

(4) Acquiring axis combination information about a machine tool in real time and switching a compensation model automatically even during machining is not taken as an assumption.

Hence, patent documents 1, 2, and 3 involve a lot of work to be done manually by a user to place a heavy load on the user.

In view of the foregoing circumstances, the present invention is intended to provide a thermal displacement compensation device capable of setting an index for an axis combination in a path and selecting a proper compensation model using the index. The present invention is further intended to provide a numerical controller including this thermal displacement compensation device.

A thermal displacement compensation device according to the present invention (numerical controller 200 described later, for example) comprises: a thermal displacement compensation setting unit (thermal displacement compensation setting unit 210 described later, for example) that sets an index of an axis combination as a target of implementation of thermal displacement compensation from control axis information data in which a control axis is recognizable, and finds an index of a compensation model matching the index, thereby selecting a corresponding compensation model; and a thermal displacement compensation unit (thermal displacement compensation unit 220 described later, for example) that calculates a compensation value from operating state data having correlation with thermal displacement and from the compensation model.

The thermal displacement compensation setting unit may comprise: a target axis index generation unit (target axis index generation unit 210-1 described later, for example) that generates a target axis index indicating an axis combination for each path on the basis of the control axis information data; a compensation model set storage unit (compensation model set storage unit 210-2 described later, for example) that stores a set of a compensation model and a compensation model index indicating an axis combination intended for compensation; an index comparison unit (index comparison unit 210-3 described later, for example) that compares the generated target axis index and the compensation model index; and a compensation model setting unit (compensation model setting unit 210-4 described later, for example). If the index comparison unit determines that the target axis index and the compensation model index match each other, the compensation model setting unit sets the compensation model corresponding to the matching compensation model index for the path for which the target axis index has been generated.

The target axis index may be a vector including a target axis number indicating each axis, and the number of the target axis numbers may correspond at least to the number of axes in a path. The target axis number may be a number calculated from a path number and an axis number and usable for recognizing a corresponding axis.

The compensation model index may be a vector including a compensation axis number indicating each axis, and the number of the compensation axis numbers may correspond at least to the number of axes in a path. The compensation axis number may be a number calculated from a path number and an axis number and usable for recognizing a corresponding axis.

A notification unit may be provided that notifies the absence of a corresponding compensation model if the index comparison unit has failed to find the compensation model index matching the target axis index.

An axis switching determination unit (axis switching determination unit 210-5 described later, for example) may be provided that detects the occurrence of change in axis combination in any path, and instructs a unit in the thermal displacement compensation setting unit other than the axis switching determination unit to reset the compensation model.

If the axis switching determination unit detects the occurrence of change in the axis combination on the basis of the control axis information data generated by an axis control information generation unit, the target axis index generation unit may generate a target axis index again.

A numerical controller (numerical controller 200 described later, for example) that outputs a command to a machine tool may comprise an axis control unit (axis control unit 250 described later, for example) that adds the compensation value calculated by the foregoing thermal displacement compensation device (thermal displacement compensation unit 220 described later, for example) to the command, and outputs the compensated command to the machine tool.

The numerical controller (numerical controller 200 described later, for example) may comprise an operating state data storage unit (operating state data storage unit 230 described later, for example) that stores the operating state data indicating an operating state of the machine tool, and supplies the operating state data to the thermal displacement compensation unit.

The present invention allows a proper compensation model to be set automatically for each axis combination in a path. If axis switching control is exerted to change an axis combination in a path during machining, the present invention allows a compensation model to be switched automatically in response to the changed axis combination.

BRIEF DESCRIPTION OF THE DRAWINGS

FIG. 4 is an explanatory view for explaining the operation of making the target axis index from the parameter relating to the control axis of the machine tool according to the first embodiment of the present invention;

FIG. 8 is an explanatory view for explaining operation of a numerical controller 200 according to a second embodiment of the present invention performed on the occurrence of axis switching during machining;

DETAILED DESCRIPTION OF THE INVENTION

Embodiments of the present invention will be described below based on the drawings.
[Principles]

Figure 1:
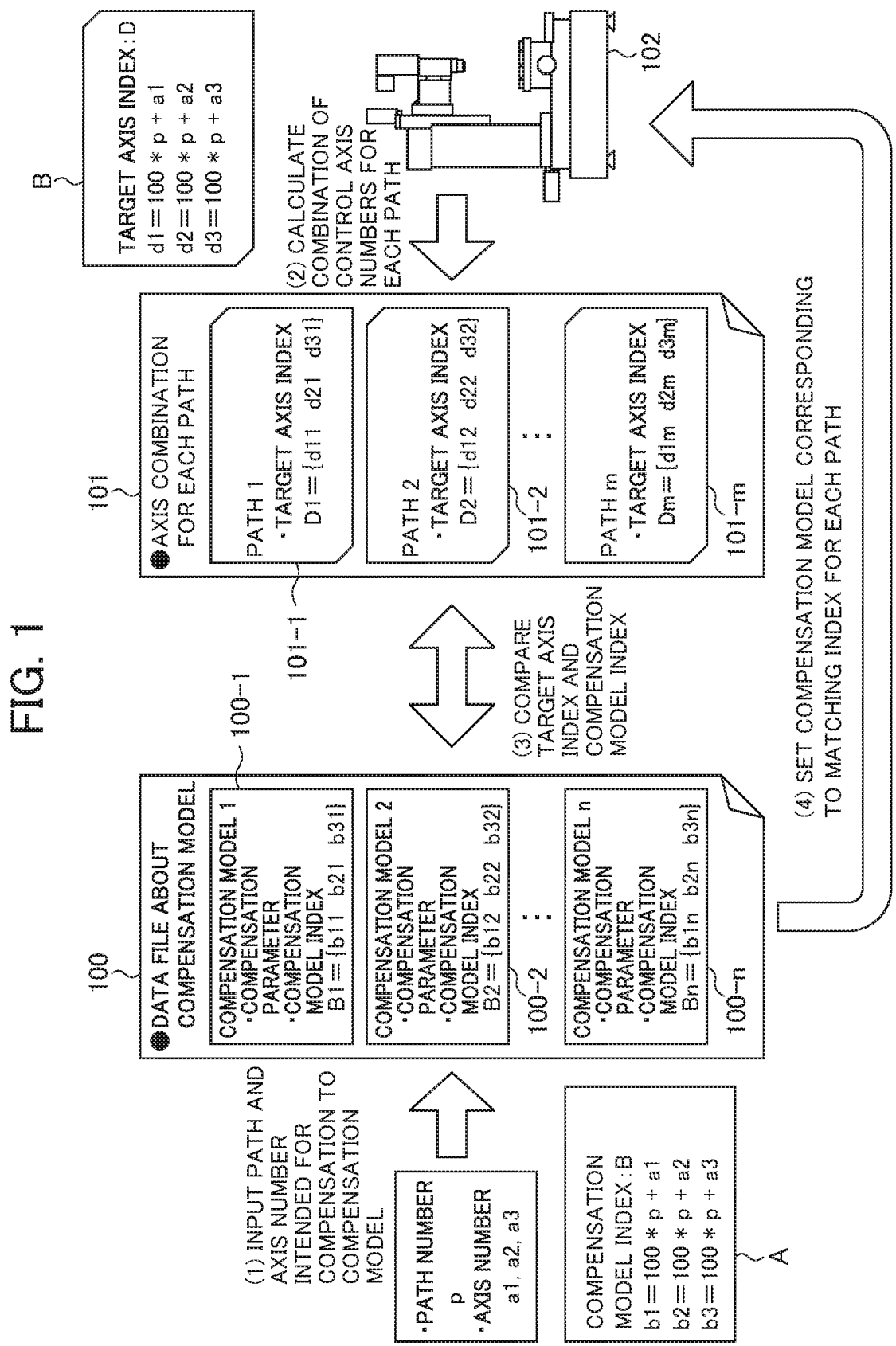
FIG. 1 is a principle diagram showing the principles of the present invention.

FIG. 1 is a principle diagram about the present invention. (1) First, learning software gives a "compensation model index" indicating a path intended for compensation and an axis combination intended for compensation to each compensation model. More specifically, the learning software makes a compensation model index in association with "path" and "axis number," and gives the compensation model index to each compensation model. This is illustrated in (1) of FIG. 1. As a mechanism of machine learning performed by such learning software, the technique disclosed in patent document 3 (Japanese Unexamined Patent Application, Publication No. 2018-111145) mentioned above is applicable, for example.

Figure 12:
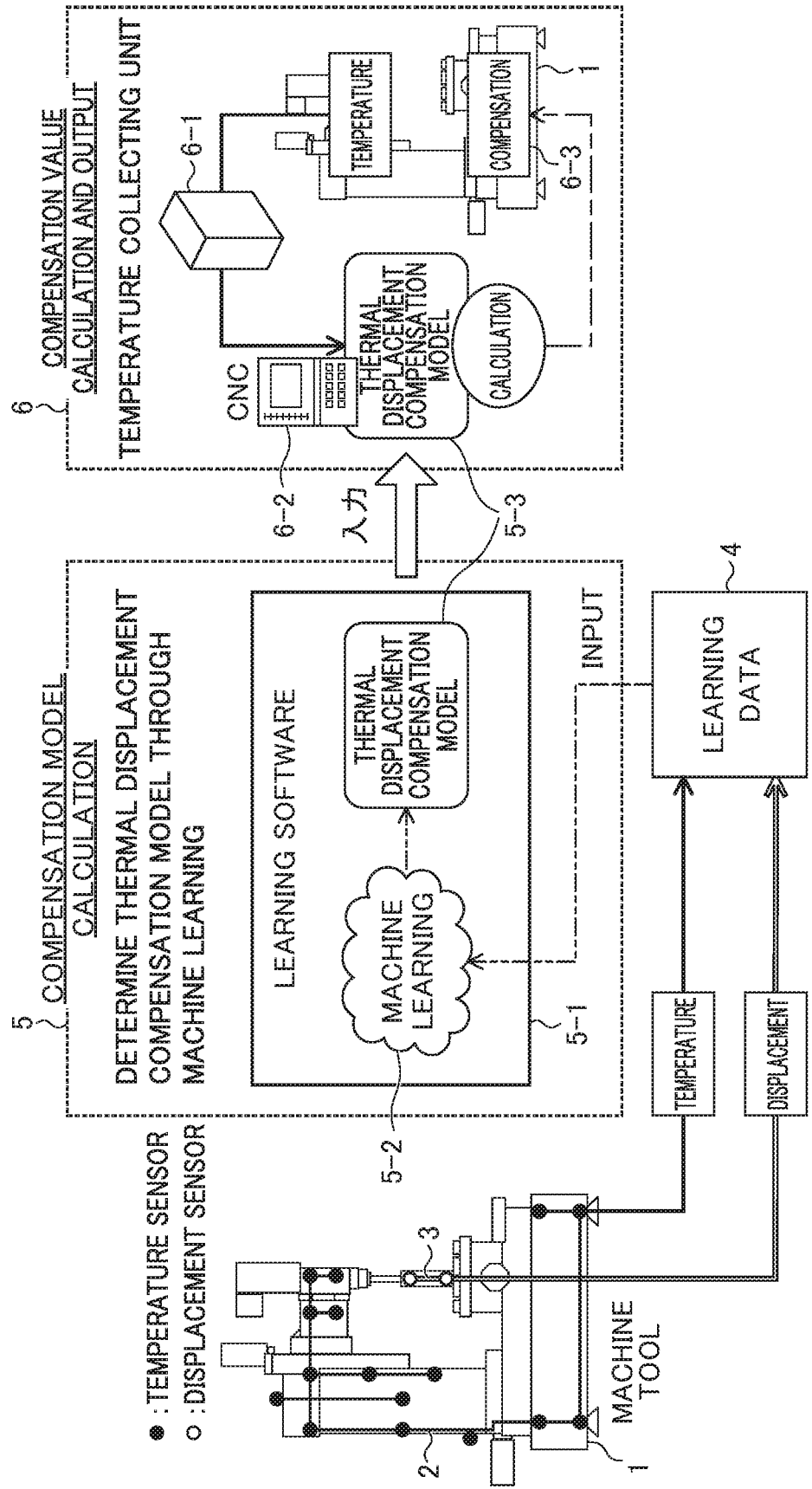
FIG. 12 is an explanatory view for explaining a conventional thermal displacement compensation function.
Figure 13:
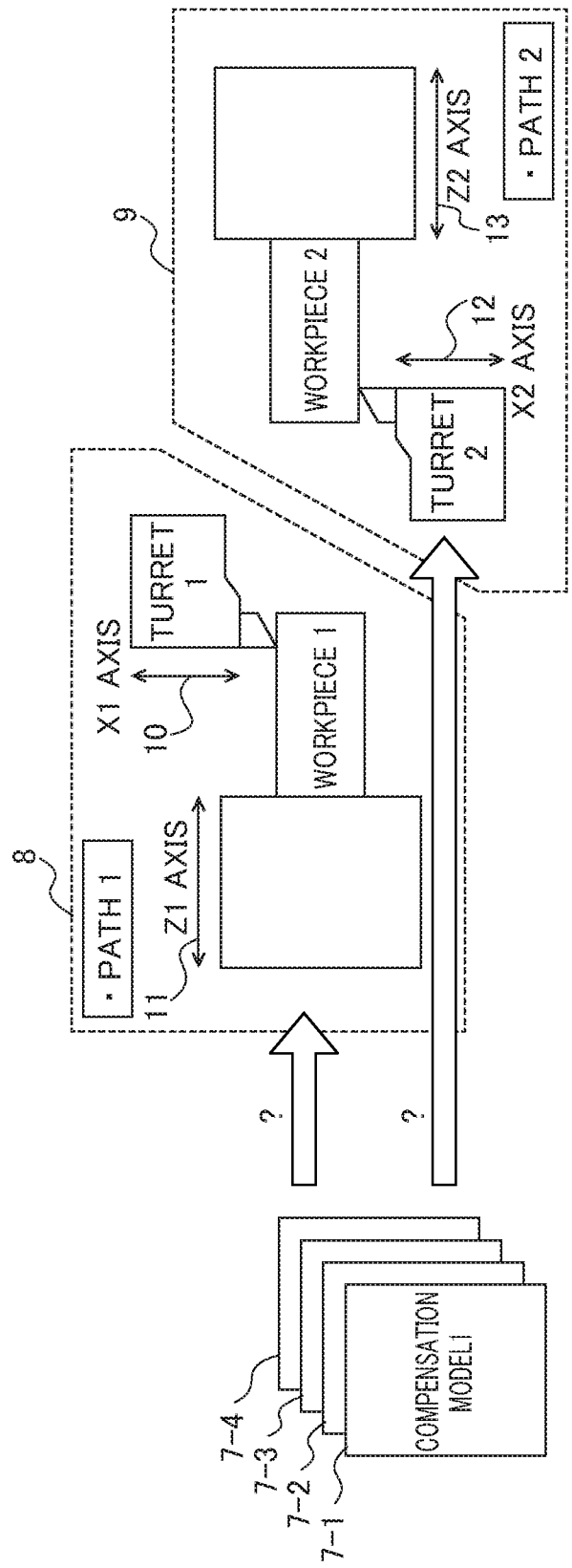
FIG. 13 is an explanatory view for explaining the conventional thermal displacement compensation function.

Referring to (1) of FIG. 1, a user inputs a path and an axis number intended to be applied to each compensation model using the learning software. The learning software is software running on a predetermined computer. As shown in FIG. 12, the predetermined computer may be a computer different from a numerical controller. In response to input of "path number" p, and "axis number" a1, a2, and a3 to a compensation model by the user, the learning software calculates a compensation model index from the input "path" and "axis number," and gives the calculated compensation model index to the compensation model. As shown in A of FIG. 1, the compensation model index is expressed as a vector. A compensation model index: B is expressed as (b1, b2, b3) using the following:

$b1=100*p+a1;$ $b2=100*p+a2;$ and $b3=100*p+a3.$

In this way, the learning software calculates a compensation model index of each compensation model and gives the compensation model index to the corresponding compensation model, thereby making a data file 100 about compensation models. In the illustration of FIG. 1, the data file 100 about compensation models contains a compensation parameter for performing compensation and a compensation model index $B1=\{b11, b21, b31\}$ defining a compensation model 1 (100-1). The data file 100 about compensation models further contains a compensation parameter for performing compensation and a compensation model index $B2=\{b12, b22, b32\}$ defining a compensation model 2 (100-2). This also applies to a compensation model n (100-$n$).

Giving the foregoing compensation model index to each compensation model allows a compensation model to be associated automatically with a path and an axis number. In the example given herein, the number of axes is "3". However, any number of axes may be prepared. If there is a path with a small number of axes, "0" may be put in a part of the foregoing index corresponding to an axis not to be used.

(2) Next, the numerical controller makes a "target axis index" about an axis combination of each path. More specifically, the numerical controller calculates a combination of control axis numbers for each "path," and gives the "target axis index" indicating this axis combination. This is illustrated in (2) of FIG. 1. In (2) of FIG. 1, the numerical controller calculates a target axis index from a combination of control axis numbers for each path of a machine tool. The numerical controller contains information about an axis number of a path acquired in advance.

More specifically, as shown in B of FIG. 1, the target axis index is expressed as a vector. A target axis index: D is expressed as (d1, d2, d3) using the following:

$d1=100*p+a1;$ $d2=100*p+a2;$ and $d3=100*p+a3.$

The meanings of p, a1, a2, and a3 are the same as those of corresponding elements in the compensation model index. In this way, the numerical controller calculates and gives a target axis index for each path, thereby making a target axis index file 101 about an axis combination for each path. In the illustration of FIG. 1, the target axis index file 101 contains a target axis index $D1=\{d11, d21, d31\}$ as a path 1 (101-1). Further, the target axis index file 101 contains a target axis index $D2=\{d12, d22, d32\}$ as a path 2 (101-2). This also applies to a path m (100-$m$). Giving the foregoing target axis index to each path makes it possible to make comparison with the compensation model index and comparison with a corresponding compensation model easily.

(3) Next, the compensation model index and the target axis index are compared. This comparison may be made by the numerical controller, for example. The numerical controller compares contents in the data file 100 about compensation models and contents in the target axis index file 101 to search for a matching compensation model index of each path.

(4) Then, a compensation model of each path corresponding to a compensation model index determined to match a target axis index is set for this path. This process may be performed by the numerical controller. Then, the numerical controller controls the machine tool on the basis of the set compensation model.

First Embodiment

Figure 2:
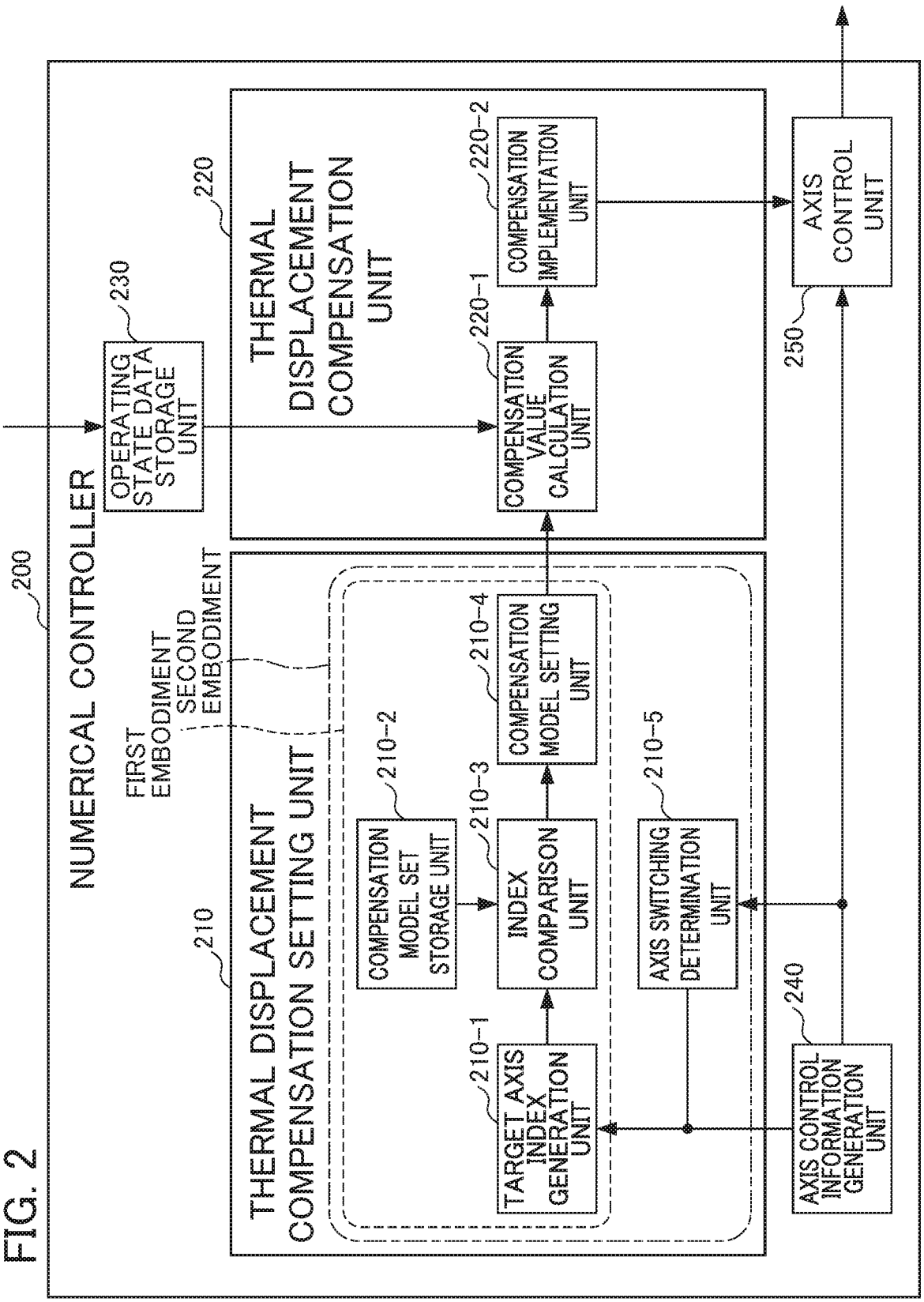
FIG. 2 is a block diagram of a numerical controller according to a first embodiment of the present invention.
Figure 3:
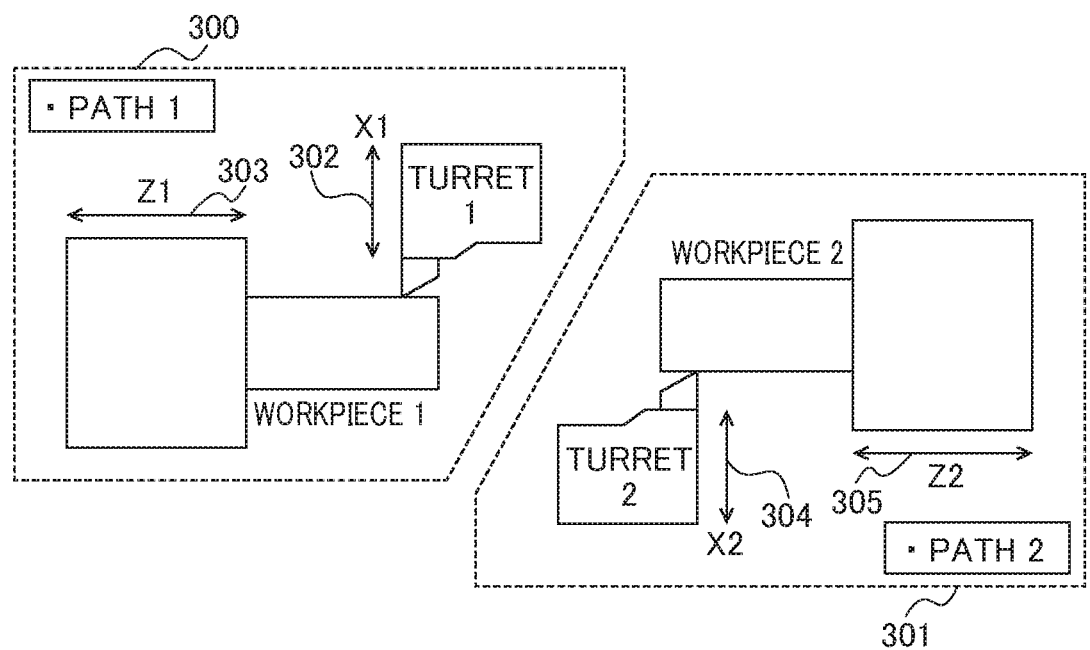
FIG. 3 is an explanatory view for explaining operation of making a target axis index from a parameter relating to a control axis of a machine tool according to the first embodiment of the present invention.
Figure 5:
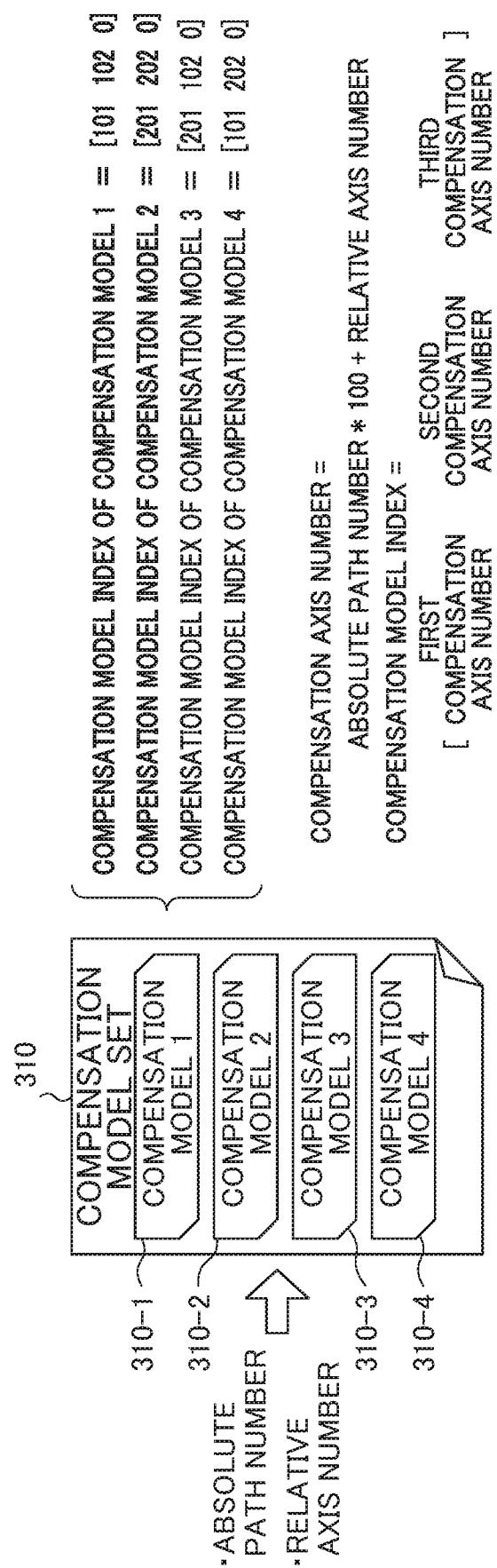
FIG. 5 is an explanatory view for explaining operation of comparing a compensation model index of each compensation model set by learning software and a target axis index and setting a compensation model for each path according to the first embodiment of the present invention.
Figure 6:
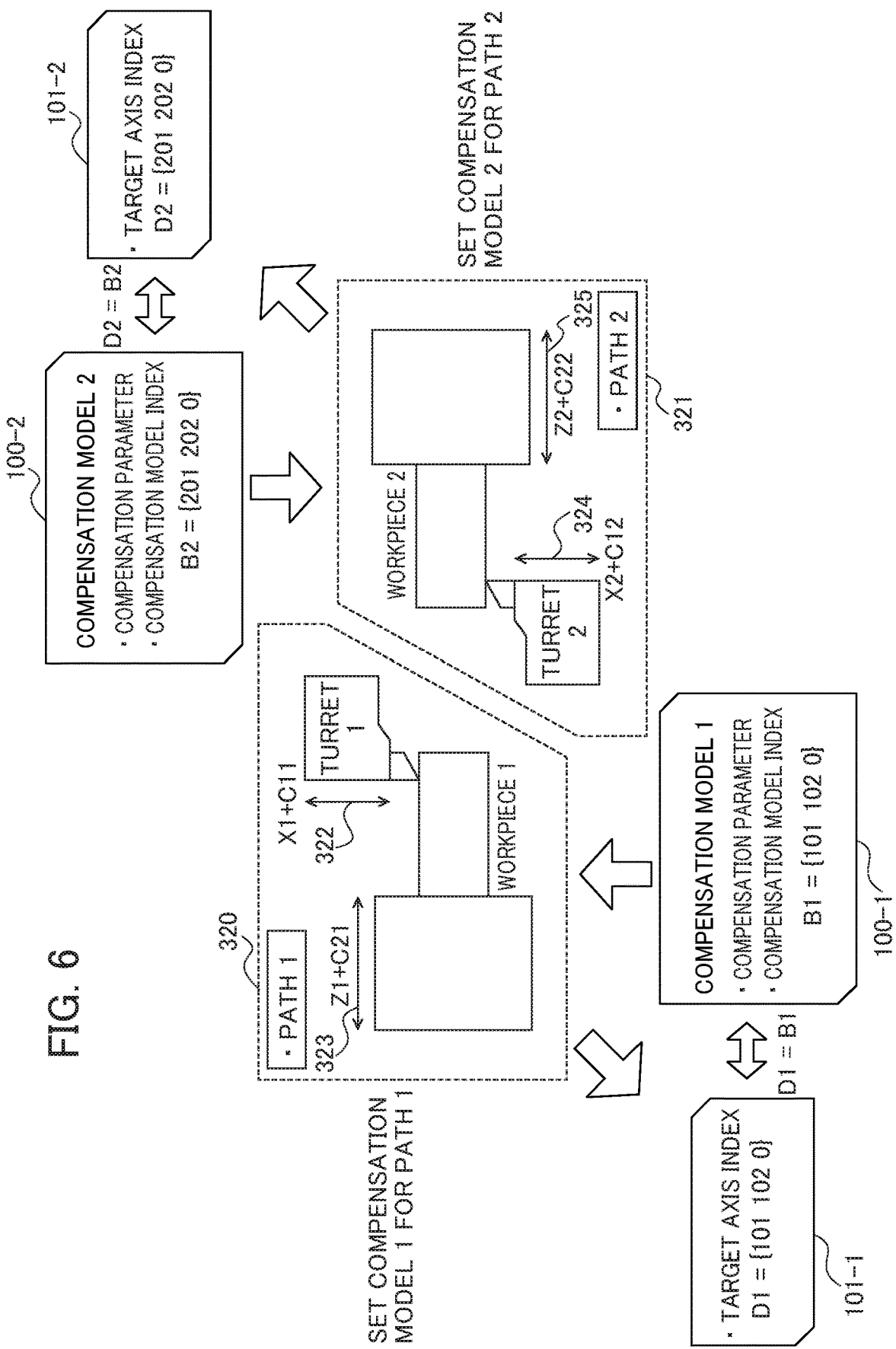
FIG. 6 is an explanatory view for explaining the operation of comparing the compensation model index of each compensation model set by the learning software and the target axis index, and setting the compensation model for each path according to the first embodiment of the present invention.
Figure 7:
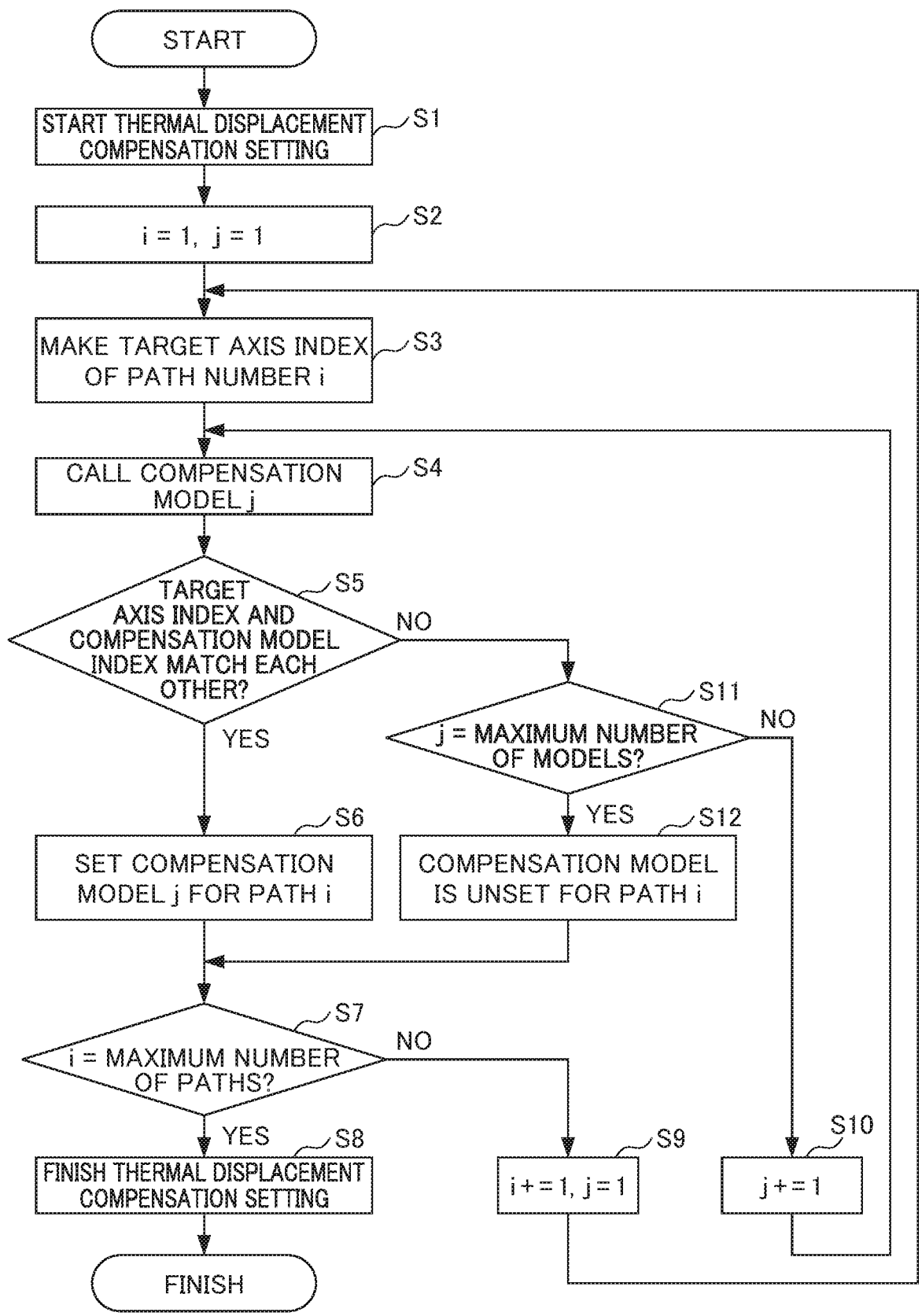
FIG. 7 is a flowchart showing the operation of a numerical controller 200 according to the first embodiment of the present invention.

FIG. 2 is a block diagram of a numerical controller 200 according to a first embodiment of the present invention. FIGS. 3 and 4 are explanatory views for explaining operation of making a target axis index from a parameter relating to a control axis of a machine tool. FIGS. 5 and 6 are explanatory views for explaining operation of comparing a compensation model index of each compensation model set by the learning software and a target axis index, and setting a compensation model for each path. FIG. 7 is a flowchart showing the operation of the numerical controller 200 according to the first embodiment.

As shown in FIG. 2, the numerical controller 200 according to the first embodiment includes a thermal displacement compensation setting unit 210, a thermal displacement compensation unit 220, an operating state data storage unit 230, an axis control information generation unit 240, and an axis control unit 250. The thermal displacement compensation setting unit 210 compares a target axis index and a compensation model index, and sets a compensation model corresponding to the compared target axis index. As a result of implementation of such operation, the thermal displacement compensation setting unit 210 selects a compensation model corresponding to an axis combination intended for thermal displacement compensation from control axis information data in which a control axis is recognizable. The thermal displacement compensation setting unit 210 includes a target axis index generation unit 210-1, a compensation model set storage unit 210-2, an index comparison unit 210-3, a compensation model setting unit 210-4, and an axis switching determination unit 210-5. A target axis index may be called simply as an index.

The target axis index generation unit 210-1 generates the target axis index described above. The target axis index generation unit 210-1 acquires a path number and an axis number necessary for generation of the target axis index from the control axis information data. The control axis information data is data generated by the axis control information generation unit 240 described later and data in which a control axis is recognizable. The index comparison unit 210-3 compares the generated target axis index and a set of compensation models, and selects a matching compensation model. The set of the compensation models is stored in the compensation model set storage unit 210-2, and supplied to the index comparison unit 210-3.

The index comparison unit 210-3 feeds the matching compensation model to the compensation model setting unit 210-4. The compensation model setting unit 210-4 receives the fed compensation model, and sets the received compensation model as a compensation model to be used by the numerical controller 200 for a corresponding path. This setting may be made by process such as writing contents in the compensation model into internal storage means, and providing the contents to the thermal displacement compensation unit 220, for example. Such process is performed by the compensation model setting unit 210-4. The compensation model set storage unit 210-2 stores the compensation model set and supplies the compensation model set to the index comparison unit 210-3. The axis switching determination unit 210-5 determines whether an axis has been changed during machining. Details of this operation will be described in a second embodiment.

The thermal displacement compensation unit 220 performs predetermined compensation on a command to be supplied to the machine tool on the basis of the set compensation model. More specifically, the thermal displacement compensation unit 220 calculates a compensation value from operating state data having correlation with thermal displacement and from the compensation model, and supplies the calculated compensation value to the axis control unit 250. By doing so, displacement caused by heat can be compensated for. The operating state data mentioned herein is data supplied from the operating state data storage unit 230. The compensation model used herein is the foregoing compensation model set by the compensation model setting unit 210-4. The thermal displacement compensation unit 220 includes a compensation value calculation unit 220-1 and a compensation implementation unit 220-2. The compensation value calculation unit 220-1 calculates a compensation value from the operating state data and the compensation model, and supplies the calculated compensation value to the compensation implementation unit 220-2.

The operating state data storage unit 230 is a data storage unit storing an operating state (including a temperature) in which a path (machine tool) is placed. The operating state data storage unit 230 provides the compensation value calculation unit 220-1 with operating state data. This operating state data is data indicating the operating state of the machine tool, particularly, data further containing a temperature and data having correlation with thermal displacement. This temperature can be used as a basis for compensating of the thermal displacement. The operating state data may contain any type of data other than a temperature such as an axis torque, an axis rotation number, and other type of data indicating an operating state. The axis control information generation unit 240 generates the control axis information data indicating an axis belonging to a corresponding path. The control axis information data is supplied to the target axis index generation unit 210-1 to be used for generating a target axis index. The control axis information data is further provided to the axis control unit 250 to be used for supplying a command to an axis.

The axis control unit 250 is means of outputting a command to the machine tool. Basically, the axis control unit 250 supplies a command based on a machining program to a machine tool of a corresponding path. This command is supplied by using axis control information about this path. Further, the axis control unit 250 receives a compensation value determined by a temperature from the compensation implementation unit 220-2, adds the received compensation value to the command, and then supplies the resultant command to the machine tool.

<Thermal Displacement Compensation Device and Numerical Controller>

In this embodiment, a configuration including at least the thermal displacement compensation setting unit 210 and the thermal displacement compensation unit 220 and responsible for calculation of a compensation value is called a thermal displacement compensation device. The thermal displacement compensation device is available for various purposes. The thermal displacement compensation device may be provided in a machine tool or installed on a robot. A device including the thermal displacement compensation device and responsible for output of a command to a machine tool may be configured as a numerical controller. The numerical controller 200 of such a configuration is shown in the block diagram of FIG. 2. In the block diagram of FIG. 2, the axis control unit 250, which adds a compensation value calculated by the thermal displacement compensation device to a command, can output the compensated command to a machine tool and becomes functional as a numerical controller. In the block diagram of FIG. 2, the operating state data storage unit 230 stores the operating state of the machine tool as operating state data, and supplies the operating state data to the thermal displacement compensation unit 220 (the compensation value calculation unit thereof). By doing so, a compensation value can be calculated more accurately, so that the numerical controller 200 with improved performance of handling heat can be provided.

<Making of Target Axis Index>

FIGS. 3 and 4 are explanatory views for explaining making of a target axis index. In the illustration of FIG. 3, there are two paths including a path 1 (300) and a path 2 (301). The path 1 (300) includes an X1 axis 302 for moving a turret 1 and a Z1 axis 303 for moving a workpiece 1. The path 2 (301) includes an X2 axis 304 for moving a turret 2 and a Z2 axis 305 for moving a workpiece 2.

In this state, an absolute path number and a relative axis number are given to each axis, as shown in FIG. 4. FIG. 4 shows that the X1 axis is given an absolute path number of 1 and a relative axis number of 1, for example. The other axes are given corresponding numbers shown in FIGS. 3 and 4. Each numerical value d in a target axis index is called a target axis number. Then, the target axis index is expressed as [first target axis number, second target axis number, third target axis number].

As shown in FIG. 1, the target axis number (d) is obtained by multiplying an absolute path number by 100 and then add a relative axis number. Then, according to the illustration of FIG. 4, target axis indexes are obtained as follows:
Target axis index of path 1=[101, 102, 0].
Target axis index of path 2=[201, 202, 0].

A third target axis number is prepared in consideration of use of a machining center, for example. If the number of axes is less than three, a corresponding part can be filled with 0 as explained above, for example. As described above, a target axis number is a number calculated from a path number (absolute path number) and an axis number (relative axis number), and usable for recognizing a corresponding axis. As described above, in the first embodiment, an absolute path number and a relative axis number are determined in advance and given for each axis. The relative axis number mentioned herein is a relative ordinal number for an axis showing the order of this axis in a corresponding path. By contrast, a path number shows an absolute order.

<Compensation Model Setting>

FIGS. 5 and 6 are explanatory views for explaining setting of a compensation model. As described above, a compensation model index of each compensation model set by the learning software and the foregoing target axis index are compared to set a compensation model for each path. As shown in FIG. 5, a compensation model is calculated from an absolute path number and a relative axis number. In the illustration of FIG. 5, a compensation model 1 (310-1), a compensation model 2 (310-2), a compensation model 3 (310-3), and a compensation model 4 (310-4) are shown, and these models are together called a compensation model set 310.

A compensation model index contains an element b (see FIG. 1) called a compensation axis number, and the compensation model index is defined as [first compensation axis number, second compensation axis number, third compensation axis number]. The compensation axis number is obtained by multiplying an absolute path number by 100 and then add a relative axis number (see FIG. 1). Thus, a compensation model index of the compensation model 1 is expressed as [101, 102, 0], for example. The compensation model 2, the compensation model 3, and the compensation model 4 are calculated in the same way. See FIG. 5 for particular numerical values.

A compensation model and a compensation model index are not always required to be prepared for every combination. In fact, in some cases, only several types of patterns can be put into actual use. In such cases, a compensation model and a compensation model index may be calculated for only a combination likely to be put into actual use. Such a compensation model and such a compensation model index may be stored in the compensation model set storage unit 210-2. Then, the compensation model index is compared with a target axis index by the index comparison unit 210-3.

In the illustration of FIG. 6, there are two paths including a path 1 (320) and a path 2 (321). The path 1 (320) includes an X1+C11 axis 322 for moving a turret 1 and a Z1+C21 axis 323 for moving a workpiece 1. The path 2 (321) includes an X2+C12 axis 324 for moving a turret 2 and a Z2+C22 axis 325 for moving a workpiece 2.

Here, C11, C21, C12, and C22 mean compensation values output from the compensation value calculation unit 220-1 and to be added while "instruction" is being given from the compensation implementation unit 220-2. In this state, a target axis index of the path 1 (320) is {101 102 0}. Further, a target axis index of the path 2 (321) is {201 202 0}. As understood from comparison between these indexes with compensation model indexes, a compensation model index {101 102 0} of the compensation model 1 (see FIG. 5) matches the path 1 (320), and a compensation model index {201 202 0} of the compensation model 2 matches the path 2 (321). These comparisons are made by the index comparison unit 210-3.

As a result, the compensation model 1 (100-1), (310-1) is set for the path 1 (320), and the compensation model 2 (100-2), (310-2) is set for the path 2 (321). These settings are made by the compensation model setting unit 210-4.

<Operation of Numerical Controller>

FIG. 7 is a flowchart showing an example of the operation of the numerical controller. First, in step S1, thermal displacement compensation setting is started. This means that setting of a compensation model to be used for a path is started. In step S2, an initial value is set. A sign i indicating a path number is set at 1 and a sign j indicating a compensation model is also set at 1. These are to be applied to generation of a target axis index and are set by the target axis index generation unit 210-1 accordingly.

In step S3, the target axis index generation unit 210-1 generates (makes) a target axis index of the path number i, and supplies the target axis index to the index comparison unit 210-3. In step S4, the index comparison unit 210-3 calls a compensation model index of the compensation model j from the compensation model set storage unit 210-2.

In step S5, the index comparison unit 210-3 compares the supplied target axis index and the called compensation model index to determine whether these indexes match each other. If these indexes are determined to match as a result of the comparison, the flow goes to step S6. If these indexes are determined not to match, the flow goes to step S11. In step S6, as a result of the presence of the match, the index comparison unit 210-3 supplies the compensation model j of the matching compensation model index to the compensation model setting unit 210-4. The compensation model setting unit 210-4 sets the supplied compensation model for the corresponding path i.

In step S7, it is determined whether i is the maximum number of paths. If YES, the flow goes to step S8. If NO, the flow goes to step S9 to repeat the process again. In step S8, as settings of the compensation models for all paths have been finished, the thermal displacement compensation is finished.

In step S9, i is incremented by 1 and j is reset to 1. These variables are to be applied to generation of a target axis index, so that these increment and reset are made by the target axis index generation unit 210-1. Then, the flow goes to step S3 to generate (make) a target axis index again. In step S11, the index comparison unit 210-3 determines whether j is the maximum number of compensation models. If j is determined to be the maximum number of models, the flow goes to step S12. If j is determined not to be the maximum number of models, the flow goes to step S10.

In step S12, a compensation model is unset for the corresponding path i. Namely, the compensation model setting unit 210-4 does not set a compensation model for the corresponding path i. The reason for this is that no matching compensation model could be found. This step can be fulfilled by simply omitting setting of a compensation model.

Alternatively, a notification unit (not shown) may be provided for notifying a user, etc. of the failure to find a corresponding compensation model. The presence of this notification unit allows the user to recognize that compensation models are insufficient, so that the user is motivated to prepare compensation models. The compensation model setting unit 210-4 may further function as the notification unit. Then, the flow goes to step S7 to proceed to process on a next path (if any).

In step S10, j is incremented by 1. This variable is to be applied to generation of a target axis index, so that this increment is made by the target axis index generation unit 210-1. Then, the flow goes to step S4 to call a different compensation model.

As a result of the foregoing process, a compensation model matching each path can be set.

Second Embodiment

Figure 9:
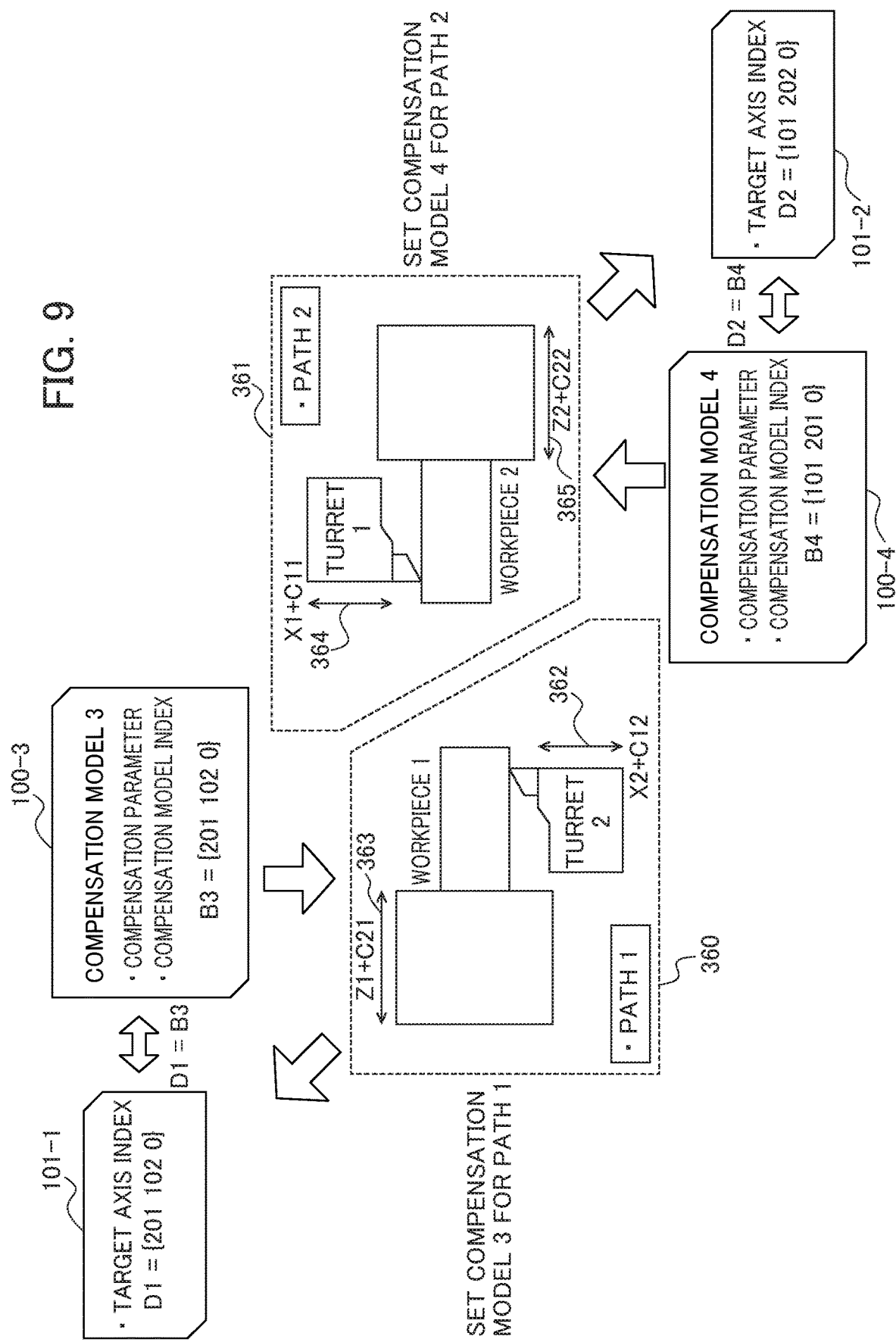
FIG. 9 is an explanatory view for explaining the operation of the numerical controller 200 according to the second embodiment of the present invention performed on the occurrence of the axis switching during the machining.
Figure 10:
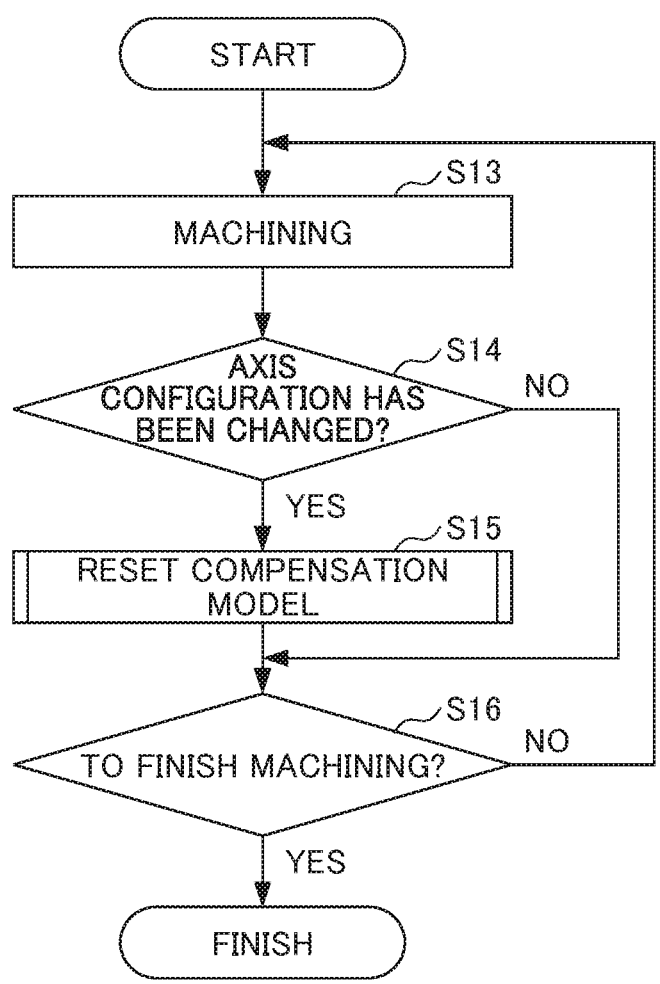
FIG. 10 is a flowchart showing the operation of the numerical controller 200 according to the second embodiment of the present invention.
Figure 11:
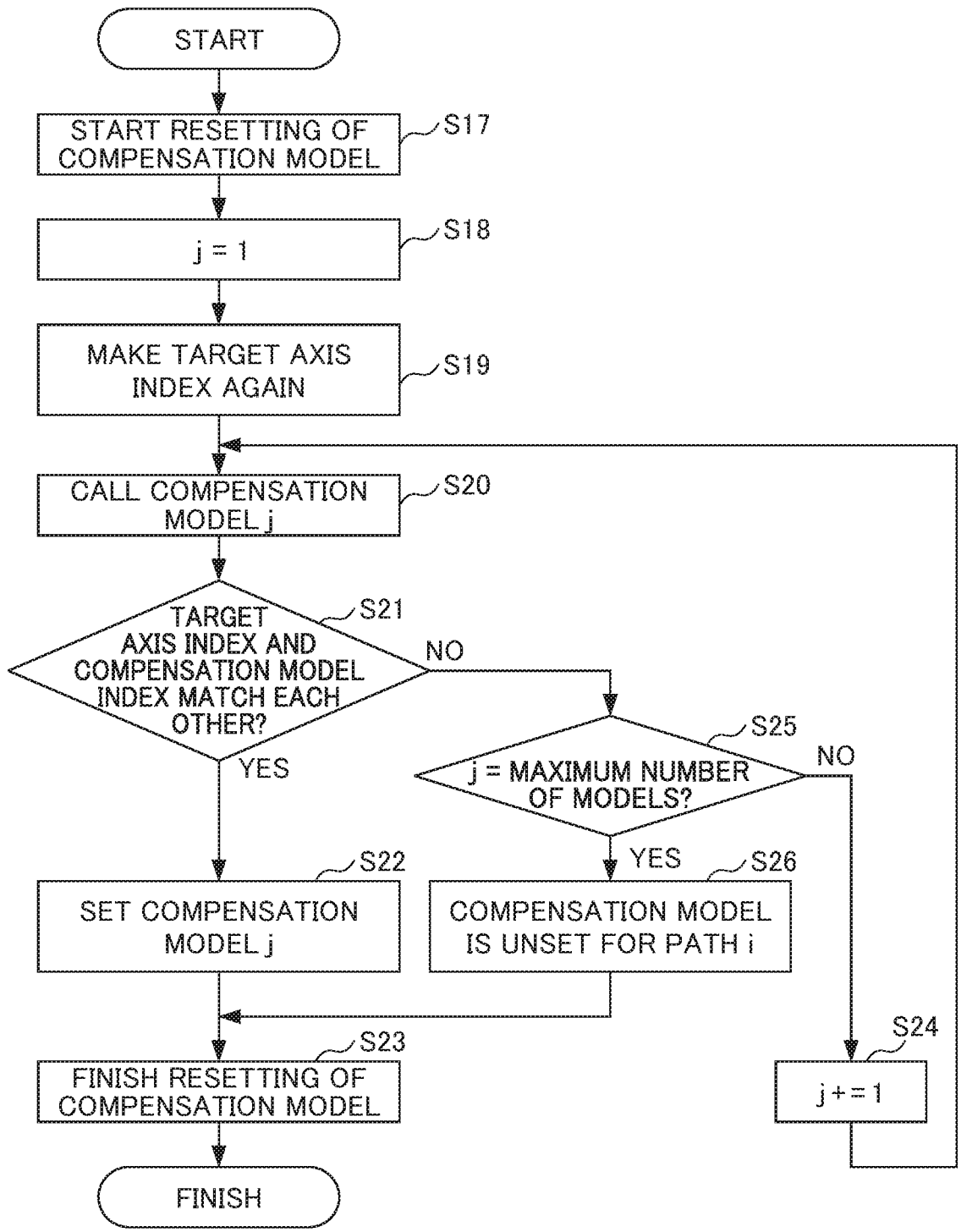
FIG. 11 is a flowchart showing the operation of the numerical controller 200 according to the second embodiment of the present invention.

FIG. 8 is an explanatory view for explaining the operation of a numerical controller 200 according to a second embodiment performed on the occurrence of axis switching during machining. FIG. 9 is also an explanatory view for explaining the situation of the operation performed on the occurrence of the axis switching during machining. FIGS. 10 and 11 are flowcharts showing the operation of the numerical controller 200 according to the second embodiment.

FIG. 8 explains a case where axes are switched during machining. As shown in FIG. 8, in this case, there are two paths including a path 1 (340) and a path 2 (341). At the time of start of the machining, the path 1 (340) includes an X1 axis 342 and a Z1 axis 343. Further, the path 2 (341) includes an X2 axis 344 and a Z2 axis 345. A target axis index of the path 1 in this state is expressed as [101 102 0] and a target axis index of the path 2 in this state is expressed as [201 202 0]

The following describes an example where axes are switched for the convenience of the machining. In FIG. 8, as a result of switching between the X axes in the foregoing axis configuration, the X2 axis 344 and the Z1 axis 343 are present in the path 1 (340). Further, the X1 axis 342 and the Z2 axis 345 are present in the path 2 (341). A target axis index of the path 1 in this state is expressed as [201 102 0], and a target axis index of the path 2 in this state is expressed as [101 202 0]. Namely, the X1 axis and the X2 axis are switched.

Corresponding target axis numbers are also switched and target axis indexes are made again. A compensation model set is not changed. Compensation models same as the foregoing compensation models shown in FIG. 5 are also used. The occurrence of such switching can be handled by making new target axis indexes again and making comparison with compensation model indexes again. As a result, compensation models are newly set, as shown in FIG. 9.

<Compensation Model Setting>

A path 1 (360) in FIG. 9 includes an X2+C12 axis 362 and a Z1+C21 axis 363. Thus, a target axis index is expressed as {201 102 0}. A path 2 (361) in FIG. 9 includes an X1+C11 axis 364 and a Z2+C22 axis 365. Thus, a target axis index is expressed as {101 202 0}. In this state, matching compensation model indexes are searched for again to set the compensation model 3 (100-3), (310-3) for the path 1 (360), and the compensation model 4 (100-4), (310-4) for the path 2 (361). In this way, according to the second embodiment, even on the occurrence of axis switching on the way, a new matching compensation model can be searched for by calculating a target axis index again. As a result, even on the occurrence of change in an axis configuration during machining, thermal displacement compensation can be performed.

<Process Responsive to Change in Axis Configuration>

FIG. 10 is a flowchart showing how the numerical controller operates for performing process responsive to the occurrence of change in an axis configuration. First, in step S13, a workpiece is machined. The machining is started by reading of a machining program and output of a proper command to a servo motor of a machine tool by the numerical controller 200.

In step S14, it is determined whether an axis configuration has been changed. This determination is made by the axis switching determination unit 210-5 in FIG. 2. The axis switching determination unit 210-5 monitors axis control information generated by the axis control information generation unit 240 to determine whether axis switching has been made. If axis switching has been detected, the flow goes to step S15 to urge the other units of the thermal displacement compensation setting unit 210 to reset a compensation model. More specifically, each unit is instructed (notified) to perform the operation of setting a compensation model again. Meanwhile, in the absence of axis switching, the flow goes to step S16.

In step S15, the numerical controller 200 makes a new setting again in response to the change in an axis configuration. The details of this setting will be described by referring to the flowchart of FIG. 11. In step S16, it is determined whether the machining is to be finished. If the machining is to be finished, the machining is finished. If the machining is not to be finished, the flow goes to step S13 to continue the machining.

<Details of Resetting of Compensation Model (Step S15)>

FIG. 11 is a flowchart showing detailed operation of resetting a compensation model (step S15) shown in FIG. 10. First, in step S17, resetting of a compensation model is started. This is process for resetting a compensation model for a path in which the occurrence of change in an axis configuration has been detected by the axis switching determination unit 210-5. In this case, there is only one path. Thus, unlike the case of FIG. 7, the variable i is not used by only j indicating a compensation model is used as a variable. In step S18, the variable j is set at an initial value of 1. This setting is made by the target axis index generation unit 210-1.

In step S19, the target axis index generation unit 210-1 makes a target axis index again for a target path. More specifically, in response to detection of the path in which an axis configuration has been changed by the axis switching determination unit 210-5 as a trigger, the target axis index generation unit 210-1 makes a target axis index again for the target path. In step S20, the index comparison unit 210-3 calls the compensation model j from the compensation model set storage unit 210-2.

In step S21, the index comparison unit 210-3 compares the read compensation model j and the target axis index made again to determine whether there is a match therebetween. If the match is determined to be present, the flow goes to step S22. If the match is determined to be absent, the flow goes to step S25. In step S22, as a result of the presence of the match, this compensation model j is set for a corresponding path.

In step S23, the resetting of the compensation model is finished. In step S25, it is determined whether j is the maximum number of compensation models. If j is determined to be the maximum number, the flow goes to step S26. If j is determined not to be the maximum number, the flow goes to step S24. In step S26, it is determined that the path currently in focus is not available for setting of a compensation model. Then, the flow goes to step S23 and the process is finished. In this step, like in step S12, a notification unit may be provided for notifying a user, etc. of the failure to find a compensation model. Such notification will motivate the user to prepare compensation models.

The notification may be given in various methods. The notification may be presented on a display. The notification may be given by voice. The notification may be given in the form of a buzzer or an alarm. These are also applied to step S12. In step S24, for comparison with a different compensation model, j is incremented by 1. Then, the flow goes to step S20 to continue calling a compensation model to be a new comparison target. As a result of the foregoing process, the compensation model can be reset.

Effect of Embodiments

As described above, according to the first embodiment and the second embodiment, an index of a compensation model and a target axis index are compared. If these indexes are determined to match each other, this compensation model is set for a corresponding path. Thus, even if there are a large number of paths, a corresponding compensation model can be set promptly. As described in the second embodiment, further, even on the occurrence of change in an axis configuration in a path, a matching compensation model can be searched for and set again in response to the axis switching.

Other Embodiments

While the embodiments of the present invention have been described above, the present invention should not be limited to the foregoing embodiments. The effects described in the embodiments are merely a list of the most preferable effects resulting from the present invention. Effects achieved by the present invention should not be limited to those described in the embodiments.

First Modification

In the examples described in the first embodiment and the second embodiment, the thermal displacement compensation setting unit 210 is stored in the numerical controller 200. Alternatively, the thermal displacement compensation setting unit 210 may be located outside a housing of the numerical controller 200. Still alternatively, the thermal displacement compensation setting unit 210 may be configured as an external attachment device or may be provided in a remote place through a communication line. Still alternatively, the thermal displacement compensation setting unit 210 may be located on a network or may be configured using a cloud. An example of an available system is a system called Fog computing (registered trademark of Cisco Systems, Inc.) of sharing a function for controlling a machine tool on a cloud. There is also a known system called FIELD system (FIELD is a registered trademark of FANUC CORPORATION) of networking a machine tool or a robot using Fog computing. Implementing the present invention on such a system is also preferred.

Second Modification

The numerical controller 200 in the first embodiment and the second embodiment may be a computer system including a CPU. In this case, the CPU reads a program stored in a storage unit such as a ROM, for example, thereby allowing a computer to function as the thermal displacement compensation setting unit 210, the thermal displacement compensation unit 220, the operating state data storage unit 230, the axis control information generation unit 240, and the axis control unit 250 by following the read program.

Third Modification

In the examples described in the first embodiment and the second embodiment, the numerical controller 200 is provided for numerical control of a machine tool. Meanwhile, as long as the machine tool has the function of performing the same operation, the machine tool itself may be responsible for implementation of this operation. Further, a management computer for management of a factory entirely may be responsible for implementation of such operation in a centralized manner.

EXPLANATION OF REFERENCE NUMERALS

1 . . . Machine tool
2 . . . Temperature sensor
3 . . . Displacement sensor
4 . . . Learning data
5 . . . Compensation model calculation
5-1 . . . Learning software
5-2 . . . Machine learning
5-3 . . . Thermal displacement compensation model
6 . . . Compensation value calculation and output
6-1 . . . Temperature collecting unit
6-2 . . . CNC device
6-3 . . . Compensation
7-1 . . . Compensation model 1

7-2 . . . Compensation model 2
7-3 . . . Compensation model 3
7-4 . . . Compensation model 4
8 . . . Path 1
9 . . . Path 2
10 . . . X1 axis
11 . . . Z axis
12 . . . X2 axis
13 . . . Z2 axis
100 . . . Data file about compensation model
100-1 . . . Compensation model 1
100-2 . . . Compensation model 2
100-$n$ . . . Compensation model n
102 . . . Machine tool
101 . . . Target axis index file
101-1 . . . Target axis index 1
101-2 . . . Target axis index 2
101-$m$ . . . Target axis index m
200 . . . Numerical controller
210 . . . Thermal displacement compensation setting unit
210-1 . . . Target axis index generation unit
210-2 . . . Compensation model set storage unit
210-3 . . . Index comparison unit
210-4 . . . Compensation model setting unit
210-5 . . . Axis switching determination unit
220 . . . Thermal displacement compensation unit
220-1 . . . Compensation value calculation unit
220-2 . . . Compensation implementation unit
230 . . . Operating state data storage unit
240 . . . Axis control information generation unit
250 . . . Axis control unit
300 . . . Path 1
301 . . . Path 2
302 . . . X1 axis
303 . . . Z1 axis
304 . . . X2 axis
305 . . . Z2 axis
310 . . . Compensation model set
310-1 . . . Compensation model 1
310-2 . . . Compensation model 2
310-3 . . . Compensation model 3
310-4 . . . Compensation model 4
320 . . . Path 1
321 . . . Path 2
322 . . . X1+C11 axis
323 . . . Z1+C21 axis
324 . . . X2+C12 axis
325 . . . Z2+C22 axis
340 . . . Path 1
341 . . . Path 2
342 . . . X1 axis
343 . . . Z1 axis
344 . . . X2 axis
345 . . . Z2 axis
360 . . . Path 1
361 . . . Path 2
362 . . . X2+C12 axis
363 . . . Z1+C21 axis
364 . . . X1+C11 axis
365 . . . Z2+C22 axis

What is claimed is:

1. A thermal displacement compensation device comprising: a processor, the processor being configured to:
generate a target axis index representing an axis combination as a target of implementation of thermal displacement compensation from control axis information data in which a control axis is recognizable, and find a compensation model index representing a compensation model matching the generated target axis index to select a corresponding compensation model;
calculate a compensation value from operating state data having correlation with thermal displacement and from the selected compensation model; and
adjust an axis stroke of a machine tool based on the calculated compensation value, wherein
the target axis index and the compensation model index are each calculated from a path number and an axis number of the machine tool.

2. The thermal displacement compensation device according to claim 1, wherein the processor:
stores a set of a compensation model and the compensation model index indicating an axis combination intended for compensation;
compares the generated target axis index and the compensation model index; and
when it is determined that the target axis index and the compensation model index match each other, sets the compensation model corresponding to the matching compensation model index for a path for which the target axis index has been generated.

3. The thermal displacement compensation device according to claim 2, wherein the target axis index is a vector including a target axis number indicating each axis, and the number of the target axis numbers corresponds at least to the number of axes in a path, and
the target axis number is usable for recognizing a corresponding axis.

4. The thermal displacement compensation device according to claim 2, wherein the compensation model index is a vector including a compensation axis number indicating each axis, and the number of the compensation axis numbers corresponds at least to the number of axes in a path, and
the compensation axis number is usable for recognizing a corresponding axis.

5. The thermal displacement compensation device according to claim 2, wherein the processor notifies the absence of a corresponding compensation model when it has failed to find the compensation model index matching the target axis index.

6. The thermal displacement compensation device according to claim 2, wherein the processor detects an occurrence of change in axis combination in any path, and instructs to reset the compensation model when the occurrence of change in axis combination is detected.

7. The thermal displacement compensation device according to claim 6, wherein the processor generates a target axis index again when the occurrence of change in the axis combination is detected on the basis of the generated control axis information data.

8. A numerical controller that outputs a command to a machine tool, wherein the processor adds the compensation value calculated by the thermal displacement compensation device according to claim 1 to the command, and outputs the compensated command to the machine tool.

9. The numerical controller according to claim 8, comprising an operating state data storage device that stores the operating state data indicating an operating state of the machine tool, and supplies the operating state data to the processor.

10. The thermal displacement compensation device according to claim 1, wherein the target axis index is calculated by:

$$d = 100*p + a \qquad (1)$$

where "d" represents the target axis index, "p" in equation (1) represents the path number of the target axis, and "a" in equation (1) represents the axis number of the target axis, and the compensation model index is calculated by:

$$b = 100*p + a \qquad (2)$$

where "b" represents the compensation model axis, "p" in equation (2) represents the path number of the compensation model axis, and "a" in equation (2) represents the axis number of the compensation model axis.

\* \* \* \* \*